United States Patent [19]
Kirkpatrick

[11] 3,985,910
[45] Oct. 12, 1976

[54] METHOD OF MAKING A GASIFIED CONFECTION

[75] Inventor: Paul A. Kirkpatrick, New Rochelle, N.Y.

[73] Assignee: General Foods Corporation, White Plains, N.Y.

[22] Filed: Oct. 1, 1975

[21] Appl. No.: 618,603

[52] U.S. Cl. .............................. 426/572; 426/660; 426/474
[51] Int. Cl.$^2$ .......................................... A23G 3/00
[58] Field of Search ............ 426/572, 474, 477, 660

[56] References Cited
UNITED STATES PATENTS

| | | | |
|---|---|---|---|
| 2,082,313 | 6/1937 | Todd | 426/474 |
| 2,197,919 | 4/1940 | Bowman | 426/474 |
| 2,600,569 | 6/1952 | Oakes | 426/474 |
| 3,012,893 | 12/1961 | Kremzner | 426/572 |
| 3,503,757 | 3/1970 | Rubenstein | 426/474 |

*Primary Examiner*—Jeanette M. Hunter
*Attorney, Agent, or Firm*—Richard Kornutik

[57] ABSTRACT

This invention relates to incorporating a gas into a hot candy (sugar) melt within a pressure vessel at superatmospheric pressure. The gasified hot melt is transferred from the pressure vessel to a cooling tube, through a line or lines connecting the bottom of the pressure vessel to the bottom of the tube, by creating pressure differential between the cooling tube and the pressure vessel while venting the top of the tube to the atmosphere. When the transfer is complete, the cooling tube is isolated and the pressure within it is maintained at superatmospheric and it is cooled to a temperature below 70°F. whereby the gasified hot melt becomes a gas-containing solid matrix. Next, the cooling tube is shock-treated so that the gas-containing solid matrix is shattered into multiple fragments.

9 Claims, No Drawings

METHOD OF MAKING A GASIFIED CONFECTION

BACKGROUND OF THE INVENTION

This invention relates to the production of carbonated candy which is a hard candy containing carbon dioxide gas as disclosed in U.S. Pat. No. 3,012,893 which is herein incorporated by reference. Such a candy is made by the process which comprises fusing a fusible sugar, contacting such fusible sugar with gas at a pressure of 50–1000 p.s.i.g. for a time sufficient to permit absorbtion in said sugar of 0.5–15 milliliters of gas per gram of sugar, maintaining the temperature of said sugar during said absorption above the solidification temperature of said fused sugar and cooling said sugar under pressure to a temperature less than its fusing temperature thereby obtaining a gas-containing solid.

Typically the above process is carried out within a Parr reactor (a thick-shelled pressure vessel having a stirrer). The temperature of the mixture in the Parr reactor is generally maintained above 212° F. Carbon dioxide, which is the preferred gas, is admitted to the reactor to pressurize it to 600 p.s.i.g. The mixture is then agitated for 5 to 10 minutes. The 600 p.s.i.g. is maintained within the reactor and it is cooled to about 70° F. The Parr reactor is now opened and the product within must be removed.

However, the removal is not an easy task. The product exists as a solid mass and within this mass is encased the agitator used to mix the product when it was in a liquid state. The product is manually removed by breaking it into small sections with means such as an ice pick. The pieces of carbonated candy thus removed vary greatly in size. Not only does the basic method of manually removing create size variations, but by the nature of the carbonated candy itself the gas within it tends to explode on impact and creates particle sizes which are quite random. Additionally, amounts of product will remain adhered to the walls of the reactor and such product must be scraped off or remelted to effect its removal. Further, it has been found to take 1-½ to 2-½ or more hours to cool the product to 70° C. The reactor vessel, a major piece of equipment in the process, could potentially produce 15 to 25 times more product within a given time period if it were not necessary to cool the product within the reactor. Obviously, such procedures and results have a negative effect on any attempts to produce a carbonated candy in any great amounts.

Therefore, it will be highly desirable if a simple method were devised for cooling the carbonated candy in a vessel separate from the one in which the candy was originally infused with gas. It would also be highly desirable if the product could be removed from that vessel in a relatively uniform particle size. Further, it would be desirable to have a minimum of product remain adhering to the interior walls of said vessel.

SUMMARY OF THE INVENTION

This invention relates to a method of making a granular carbonated candy. A hot candy melt is gasified in a first pressure vessel. Next, while the melt is still at elevated temperature and pressure, it is transferred to a second pressure vessel. The product is passed from the first pressure vessel through a line to the bottom of the second pressure vessel which is initially maintained at a temperature and pressure equivalent to the first vessel. The transfer is effected by maintaining the superatmospheric pressure in the second pressure vessel at a value lower than the superatmospheric pressure in the first pressure vessel and venting the top of the second pressure vessel to atmosphere. When the transfer is complete, the vent is closed and the second pressure vessel is isolated. Next, the second pressure vessel is cooled to a temperature below 70° F. while maintaining superatmospheric pressure within the vessel so that the gasified hot melt becomes a gas-containing solid matrix. Next, the second pressure vessel is shock-treated so that the gas-containing solid matrix is shattered into multiple fragments. The pressure in the second pressure vessel is released and the product is allowed to fall out.

DETAILED DESCRIPTION OF THE INVENTION

According to the process of this invention, a first pressure vessel is charged with the hot candy melt. The melt is maintained at a temperature above 200° and preferably between 315° and 325° F. Into the headspace between the top of the liquid level of the candy melt and the top of the pressure vessel a gas is admitted at superatmospheric pressure, between 50 p.s.i. and 1,000 p.s.i., and preferably between 550 p.s.i. to 650 p.s.i. Agitation of the melt, plus the pressure of the gas, preferably carbon dioxide, causes the gas to be incorporated within a candy melt. A second pressure vessel is connected to the first pressure vessel by means of a line or manifold of lines, said line or lines having means to isolate the vessels from each other. Typically, a ball valve is placed in a line connecting the two vessels. While the candy melt is being gasified in the first pressure vessel, the valve is in the closed position. A gas, preferably the same as in the first vessel, is admitted to the second vessel so that there is no pressure differential between the two vessels. Additionally, the second vessel and transfer lines are heated to approximately the same temperature as the first vessel. Thus, at the end of the mix cycle, when the valve and the line connecting the two vessels is opened, no transfer takes place.

The gas inlet on both vessels is located in their topmost portion. The connecting line goes from the bottom of the first tank to the bottom of the second tank. Regulator valves are used on the gas lines to maintain particular pressures. The second vessel has a venting means on its topmost portion. To accomplish the transfer between the vessels, the regulator on the first vessel is set to a value slightly higher than the second vessel, i.e., 650 p.s.i. vs. 600 p.s.i., and the vent on the second vessel opened. The exact pressure differential selected may, of course, vary and is typically with the range of say 10 p.s.i. to 150 p.s.i. The pressure differential and the venting causes the candy melt to transfer from the first vessel to the second vessel.

In the preferred embodiment of this invention, the configuration of the second pressure is a cylindrical tube or pipe with a diameter ranging from 2 inches to 12 inches and the length from 24 inches to 72 inches. It is constructed to withstand pressures of at least 1000 p.s.i. at temperatures up to about 400° F. The exterior is jacketed to provide for the circulation of an appropriate cooling medium such as water, propylene glycol or liquid ammonia. The top and bottom of the tube are provided with flanges to provide access and to permit the removal of the product and subsequent cleaning of the tube. Additional cooling means may be provided within the interior of the tube to facilitate more rapid cooling of the product.

It is important that the pressures between the two tubes be equalized prior to opening the valve and the line connecting them. This prevents flashing of the melt or boiling of the mixture. At all times the candy solution must be maintained at superatmospheric pressure prior to cooling and the subsequent transformation of the melt to a crystal structure. It is preferable to maintain the pressure in the cooling tube at a constant value prior to removing the cooled product from the tube. It is most preferable to maintain the pressure in the cooling tube at least as high as the original gasifying pressure. If this is not done, the product will lose the entrapped gas. The transfer line allows the candy melt to exit the bottom of the first vessel and enter the bottom of the second vessel. The venting means is typically a needle valve or other such means which permits precise control over the exiting gas. The amount of gas vented is equivalent to the volume of the candy melt which is transferred. Thus, at the end of the transfer cycle, the valve in the connecting line between the vessels is closed. The first vessel can now be depressurized and used to begin gasifying another charge of candy melt. One mixing pressure vessel can thus be used to supply gasified product to a number of cooling tubes.

The candy melt in the second pressure vessel is allowed to cool to a temperature below 100° F. and preferably below 70° F., all the while maintaining the pressure at the original gasifying pressure, i.e. 600 p.s.i. When the cooling cycle is complete, the vent is again opened to allow any free gas to escape. Now the product exists in the cooling tube as a solid gas-containing matrix. Next, the cooling tube is shock-treated so that the gas-containing solid matrix is shattered into multiple fragments. When the sidewalls of the cooling tube are impacted, lines of fracture are developed within the crystal structure of the candy. Thus, the walls of the cells containing many bubbles of pressurized carbon dioxide break completely and the gas within is exploded. The combination of impact and exploding bubbles of carbon dioxide reduce the solid mass within the tube into many fine particles. The bottom of the cooling tube can now be opened and the product removed.

EXAMPLE

Candy melt is prepared by mixing 35-¾ pounds of sucrose, 19-¼ pounds of corn syrup, 13 pounds of water and 8 grams of food coloring in a 15-gallon kettle. The mixture is heated to between 315° F. to about 325° F. to remove water to a level below about 2%. The melt is charged to a preheated Dependable Welding Service autoclave and 31.5 milliliters of artificial flavor is added. The autoclave is sealed and carbon dioxide at a pressure of 600 p.s.i. is introduced to the headspace between the liquid level of the candy melt and the top of the autoclave. An agitator which is vertically mounted through the top portion of the autoclave is operated for 5 minutes. A jacketed cooling tube, which is 6 inches in diameter and 60 inches in height, is vertically mounted adjacent to the autoclave. A 1-inch jacketed line with a ball valve at its mid-point connects the bottom of the autoclave with the bottom of the cooling tube. The ball valve is in a closed position. The tube is pressurized with $CO_2$ to 600 p.s.i. With both vessels at 600 p.s.i. and the mixing complete, the ball valve is opened. Next, the pressure in the autoclave is increased to 650 pounds and a needle valve which vents the top of the cooling tube to atmosphere is slowly opened. When all of the candy melt is transferred to the cooling tube, the ball valve and then the vent needle valve is closed. Water, at 60° F., is circulated in the jacket of the cooling tube for 3 hours to reduce the temperature of the product to 70° F. The product at this temperature exits as a solid gas-containing matrix.

The transfer, water and gas lines are disconnected from the cooling tube and any free gas in the tube is released by opening the vent valve. Next, the sidewall of the tube is struck with a 3-pound sledgehammer, the bottom flange of the cooling tube is removed and the product is allowed to fall out.

The resultant product is a hard candy containing carbon dioxide gas which when placed in the mouth produces an entertaining popping sensation. The particles are granular in form and relatively uniform in size.

I claim:

1. A method of making a carbonated candy which comprises:
    a. obtaining a hot candy melt,
    b. introducing the hot melt into a first pressure vessel,
    c. introducing a gas at superatmospheric pressure into the first pressure vessel so that the gas is dispersed within the hot melt,
    d. introducing a gas at superatmospheric pressure into a second pressure vessel at a value equivalent to the pressure within the first pressure vessel, the first and second pressure vessels having a connecting line with valve means between the bottom of the first vessel and the bottom of the second vessel,
    e. transferring the gasified hot melt to the second pressure vessel through the connecting line by opening said valve means and then creating a pressure differential between the two vessels, said differential being effected by regulating the superatmospheric pressure in the second pressure vessel at a value lower than the superatmospheric pressure in the first pressure vessel and venting the top of the second pressure vessel,
    f. isolating the second pressure vessel while continuing to maintain a superatmospheric pressure,
    g. cooling the second pressure vessel so that the gasified hot melt becomes a gas-containing solid matrix,
    h. shock-treating the second pressure vessel so that the gas-containing solid matrix is shattered into multiple fragments,
    i. venting the second pressure vessel, and
    j. opening the second pressure vessel to allow the product to be removed.

2. The method of claim 1 wherein the gas is carbon dioxide.

3. The method of claim 2 wherein the superatmospheric pressure is maintained between 50 p.s.i. and 1000 p.s.i.

4. The method of claim 3 wherein the pressure differential maintained during transfer is 10 p.s.i. to 150 p.s.i.

5. The method of claim 4 wherein the temperature of the melt is at least 212° F.

6. The method of claim 5 wherein the amount of gas dispersed within each gram of melt is 0.5 ml. to 15.0 ml.

7. The method of claim 6 wherein the shock treatment of the second pressure vessel is effective to shatter the gas-containing solid matrix into granular particles which are relatively uniform in size.

8. The method of claim 7 wherein the second pressure vessel is vented to atmosphere through means which permit precise control over the exiting gas.

9. The method of claim 8 wherein the pressure in the second pressure vessel is maintained at a constant value from steps (d) through (f).

* * * * *